July 11, 1939.　　A. B. WILSON　　2,165,434
CONVEYER BELT
Filed Dec. 24, 1937　　3 Sheets-Sheet 1

Inventor:
Allen B. Wilson
By Davis, Lindsey, Smith & Shonts, Attys.

July 11, 1939.  A. B. WILSON  2,165,434
CONVEYER BELT
Filed Dec. 24, 1937   3 Sheets-Sheet 2
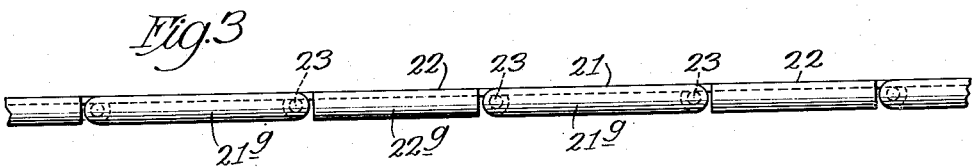
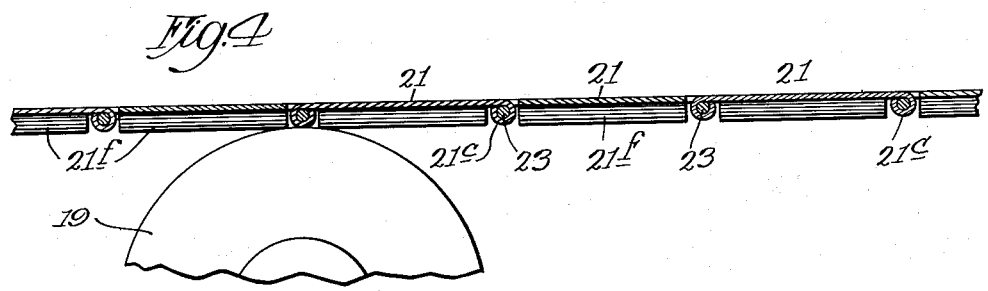
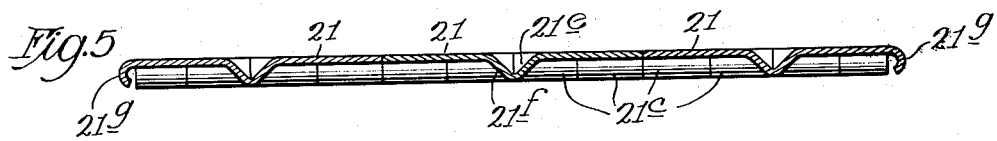
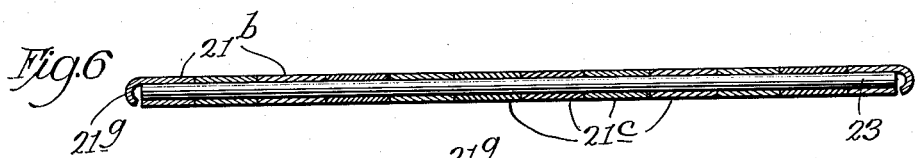
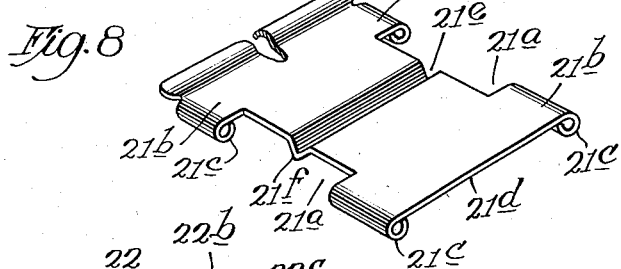
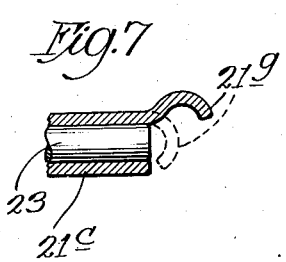
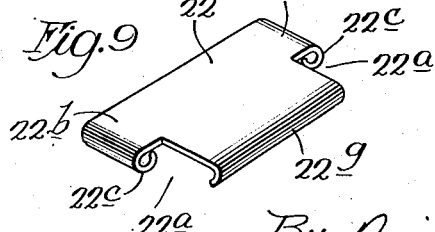
Inventor:
Allen B. Wilson
By Davis, Lindsey, Smith & Shents, Attys.

July 11, 1939.  A. B. WILSON  2,165,434
CONVEYER BELT
Filed Dec. 24, 1937   3 Sheets-Sheet 3
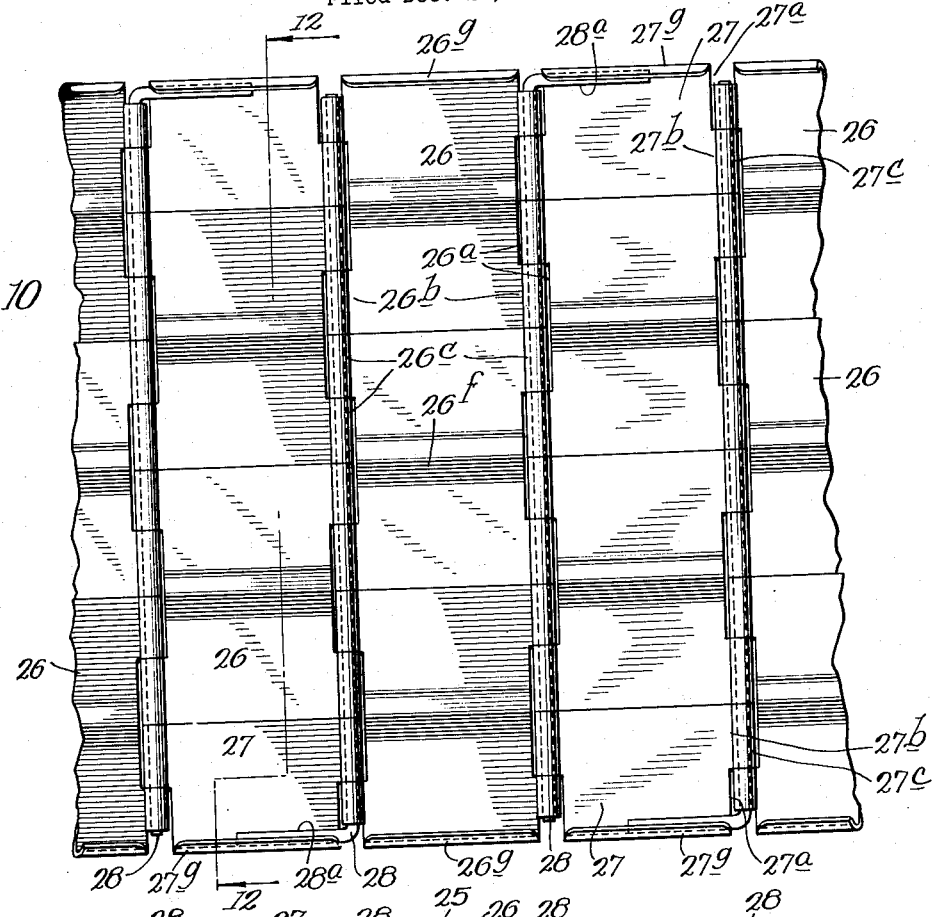
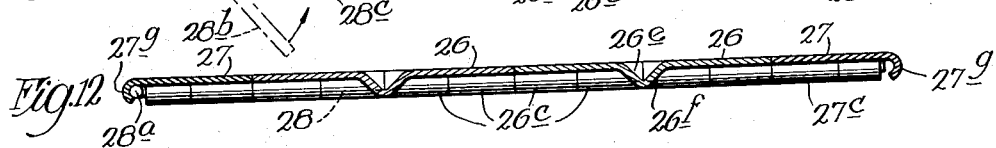
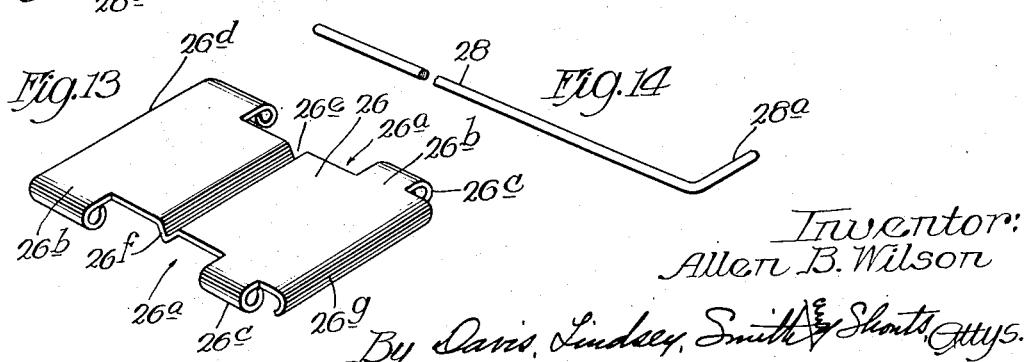
Inventor:
Allen B. Wilson
By Davis, Lindsey, Smith & Shonts, Attys.

Patented July 11, 1939

2,165,434

UNITED STATES PATENT OFFICE 2,165,434

CONVEYER BELT

Allen B. Wilson, Evanston, Ill., assignor to Acme Steel Company, Chicago, Ill., a corporation of Illinois Application December 24, 1937, Serial No. 181,477

6 Claims. (Cl. 198—189)

This invention relates to improvements in conveyer belts and its purpose is to provide an improved endless belt formed by a plurality of metal plates pivotally connected together and adapted to form a substantially continuous surface by which loose materials may be conveyed from one location to another. The present invention is an improvement upon that described and claimed in the copending application of Chester M. MacChesney, Serial No. 81,141, filed June 25, 1936, and relates to a type of conveyer belt in which a plurality of metal plates are connected together by pivot pins, the object of the present invention being to provide improved means by which these pivot pins may be retained in place after they have been inserted. A further object of the invention is to provide a conveyer belt made up of a plurality of transverse series of metal plates having parts intermeshing with parts of the plates of adjacent series, with adjacent series connected together by transverse pivot pins, the plates at the ends of certain of the series being provided with means for preventing endwise movement of the pivot pins. Another object of the invention is to provide a conveyer belt made up of a plurality of transverse series of flat metal plates pivotally connected together and provided with flanges carried by the end plates of each series for preventing endwise movement of the pivot pins. Still another object is to provide an improved conveyer belt comprising metal plates arranged in transverse rows with the plates of each row pivotally connected with those of adjacent rows by pivot pins provided with transverse parts at their ends which are adapted to be snapped into interlocking engagement with flanges carried by the end plates of the series so that the withdrawal of the pins is prevented. Other objects relate to various features of construction and arrangement which will appear more fully hereinafter.

The nature of the invention will be understood from the following specification taken with the accompanying drawings in which two embodiments are illustrated. In the drawings, Figure 1 is a somewhat diagrammatic side elevation of a conveyer belt embodying the present invention. and mounted on supporting pulleys and intervening angular pulleys;

Fig. 3 shows a side elevation of a portion of the conveyer belt illustrated in Figs. 1 and 2;

Fig. 4 shows a longitudinal section taken on the line 4—4 of Fig. 2;

Fig. 5 shows a transverse section taken on the line 5—5 of Fig. 2;

Fig. 6 shows a transverse section taken on the line 6—6 of Fig. 2;

Fig. 7 shows an enlarged vertical section similar to that of Fig. 6 through the end plate of one of the transverse series of metal plates, illustrating the manner of bending the ends around the plate to prevent the withdrawal of the pivot pin;

Fig. 8 shows a perspective view of one of the metal plates embodied in the construction shown in Figs. 1 to 7, inclusive;

Fig. 9 is a perspective view of one of the supplementary plates embodied in the construction shown in Figs. 1 to 7, inclusive;

Fig. 10 shows a bottom plan view of a portion of a conveyer belt embodying a modified form of the invention;

Fig. 11 shows a side elevation of the conveyer belt illustrated in Fig. 10;

Fig. 12 shows a transverse section taken on the line 12—12 of Fig. 10;

Fig. 13 is a perspective view of one of the metal plates embodied in the form of construction shown in Figs. 10, 11 and 12; and Fig. 14 is a perspective view of one of the pivot pins embodied in the construction shown in Figs. 10, 11 and 12.

Figure 1:
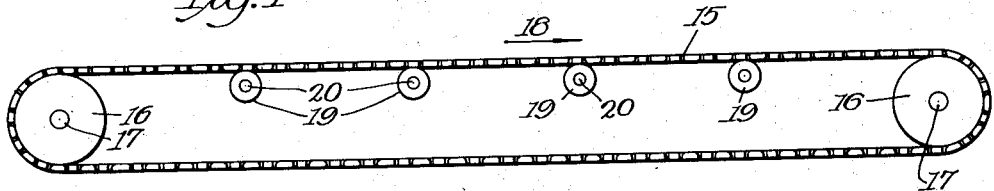
Figure 2:
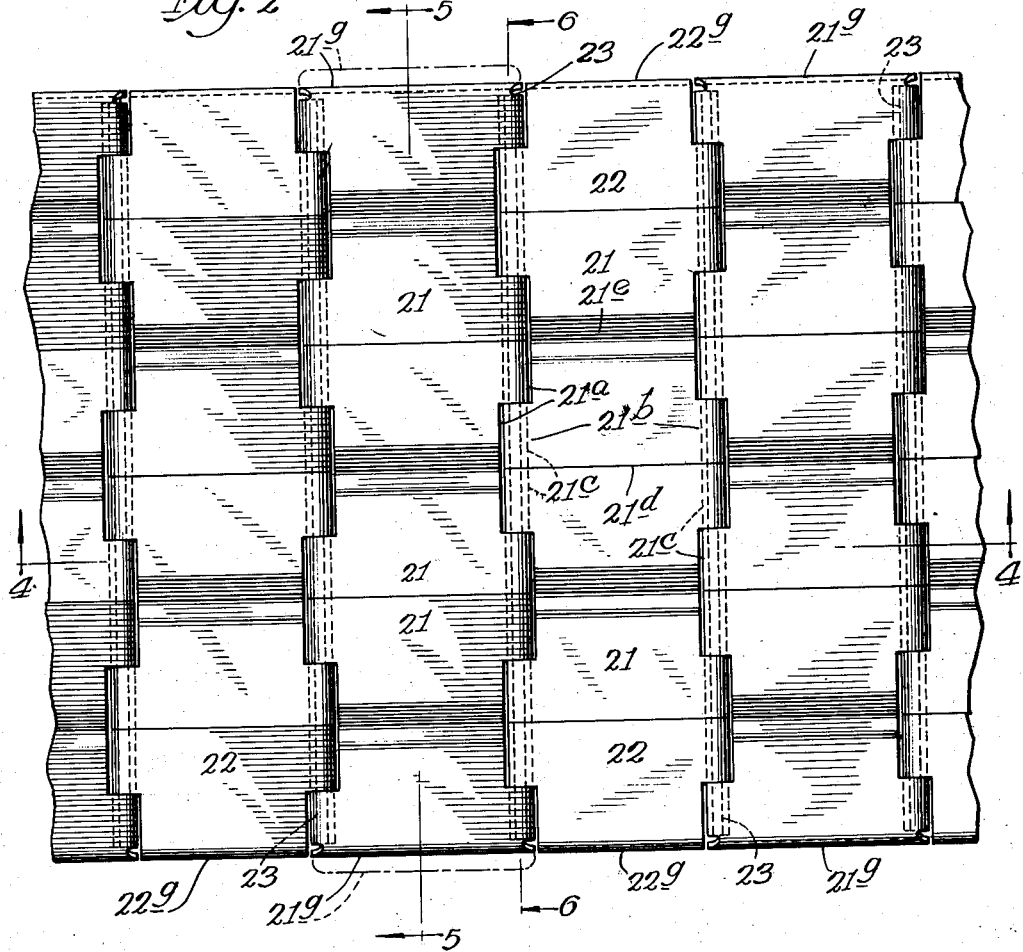
Fig. 2 shows an enlarged top plan view of a portion of the conveyer belt illustrated in Fig. 1.

As illustrated in Fig. 1, the conveyer comprises an endless belt 15 mounted to extend around two pulleys or rolls 16 which are carried by shafts 17 journaled in bearings not illustrated. One of the shafts 17 is driven by a source of power, thus causing the upper stretch of the belt to travel in the direction of the arrow 18, for example, for the purpose of conveying materials which may be discharged onto the belt by any suitable means. The upper stretch of the belt is supported between the rolls 16 by a plurality of idler rolls 19 which are carried by shafts 20. The belt 15, the details of which are shown more particularly in Figs. 2 to 9, inclusive, is made up primarily of a plurality of metal plates 21 which are substantially of the form shown in Fig. 8, these plates being supplemented at intervals along the edges of the belt by other metal plates 22 which have the form shown more particularly in Fig. 9. These plates are connected together by pivot pins, 23, each of which extends throughout the width of the belt, and the present invention is directed primarily to the means for preventing withdrawal of these pivot pins.

The belt 15 is made up of a plurality of transverse series of plates, each alternate series being made up entirely of plates 21 while the intermediate series are made up of a series of plates 21 having one of the plates 22 at each end thereof. The plates 21 of one transverse series are staggered in position with respect to the plates 21 of each next adjacent series in order to permit the plates of one series to intermesh with those of the adjacent series. Each plate 21 comprises a flat sheet metal member having oppositely located rectangular notches 21a extending inwardly from opposite sides thereof midway between the ends of the plate, thus forming at each end of the plate two oppositely disposed tongues 21b, each of which has its edge rolled to form a cylindrical bearing portion 21c. Between its ends 21d, each plate 21 is provided at its middle point with a transverse depression 21e formed by a downwardly extending V-shaped rib 21f which is pressed out of the metal of the plate. At the outer ends of those plates 21 which are located at the extreme ends of alternate rows, the body portions of the plates are provided with downwardly extending curved flanges 21g. The width of each notch 21a is such that it is adapted to be completely occupied by two of the tongues 21b carried by two adjacent plates. Thus, when two adjacent series of plates 21 are arranged side by side, in staggered relationship, the notches 21a of each plate are occupied by the tongues 21b carried by four adjacent plates. All of the plates of adjacent series are pivotally connected together by pivot pins 23 which extend through the aligned bearing portions 21c.

Due to the staggered relationship of the plates 21 in adjacent transverse series, the ends of the plates 21 in some series project beyond the ends of the corresponding plates in other series and, in order that the spaces between these projections may be occupied, thereby causing the sides of the belt to be parallel with each other, the plates 22 are inserted in these spaces at the ends of alternate series of plates 21. Each plate 22 comprises a flat body portion provided at its outer corners with angular notches 22a, thus forming on opposite sides of the plate projecting tongues 22b, each of which has its end curled downwardly to form a cylindrical bearing portion 22c. The edge of each plate 22, between the notches 22a, terminates in a downturned curved flange 22g. When the plates 22 are assembled between the end portions of two adjacent plates 21, the flanges 22g on the plates 22 are adapted to align with the flanges 21g formed on the outer ends of those plates 21 which are located at the ends of the series of plates made up entirely of plates 21.

It will be apparent from the foregoing description that by the use of the supplementary plates 22, all of the rows of plates are made of equal length measured transversely of the belt and that alternate rows of plates are made up entirely of plates 21 having the form shown in Fig. 8 except that those plates between the ends of the rows are not provided with the end flanges 21g. These flanges are provided for the purpose of preventing the withdrawal of the pivot pins 23 after these pins have been inserted through the aligning bearing portions 21c or 21c and 22c, and in the initial condition of the plates 21 which are provided with these flanges 21g, the flanges are curved in cross section but are bent upwardly, as shown in Figs. 7 and 8, so that they permit the free insertion of the pins. After the pins have been inserted, the flanges 21g are bent downwardly from the position shown by full lines in Fig. 7 to the position shown by dotted lines so that the ends of these flanges are then positioned opposite the ends of the pins 23 and the pins are prevented from being withdrawn. When thus bent downwardly, the flanges 21g are adapted to align with the adjacent flanges 22g so that the belt has a substantially smooth lateral edge at each side adapted to permit the free travel of the belt without danger of any of its parts catching on surrounding objects, such as the parallel guides which are commonly employed at the sides of conveyer belts. When thus completed and after the belt has been mounted on the rolls 18 and 19, the cylindrical bearing portions 21c and 22c are adapted to engage the surfaces of the rolls, and the ribs 21f of the plates 21 are adapted to engage these rolls between the bearing surfaces so that the belt is prevented from assuming an undulating motion during its travel. In case of damage to any one of the plates 21 or 22, the adjacent pivot pins may be withdrawn after bending upwardly the flanges 21g at the ends of these pins and the damaged plates may then readily be replaced.

In Figs. 10 to 14, inclusive, of the drawings, there is illustrated a modified form of construction in which the ends of the pivot pins are provided with parts adapted to snap into interlocking engagement with flanges carried by certain plates of the belt so that no bending of any of the parts is necessary in order to permit removal of the pins. In this form, the conveyer belt 25 is made up of a plurality of flat metal plates 26 supplemented by a plurality of auxiliary plates 27 which are employed at the ends of alternate rows and which are substantially identical in form with the plates 22 previously described. The plates 26 and 27 have bearing portions which intermesh with each other, and the plates of adjacent series are pivotally connected together by pivot pins 28 having transverse portions 28a at their ends which are adapted to interlock with flanges carried by the plates 27. The plates 26 are substantially of the form shown in Fig. 13 except that those plates which are located between the ends of rolls are not provided with downturned curved flanges, as shown at one end of the plate shown in Fig. 13. The plate comprises a substantially flat body portion having on each side a rectangular notch 26a, thus providing at each end of each plate two oppositely directed tongues 26b which have their ends downturned to form cylindrical bearing portions 26c. At one end of each plate which is employed at the end of a row and at both ends of each intermediate plate 26, the body portion of the plate has a transverse edge 26d, but at the outer end of each of those plates which are employed at the ends of the rows, the body portion of the plates is provided with a downwardly turned flange 26g which is preferably somewhat resilient so that it may spring slightly from and return to its normal position. Between the ends of the plate, there is a groove 26e provided by bending downwardly a portion of the metal of the plate to form a V-shaped rib 26f adapted to bear upon the rolls upon which the belt is carried.

Each plate 27 has a body portion provided at its outer corners with angular notches 27a and having opposite longitudinally extending tongues 27b which have their ends rolled to provide cylindrical bearing portions 27c adapted to align with the bearing portions 26c when the plates 27 are inserted at the ends of alternate rows of plates. Each plate 27 is provided with a curved flange 27ᵉ which extends downwardly and which is sufficiently resilient to permit one of the arms 28ᵃ of a pivot pin to be snapped into interlocking engagement therewith, as hereinafter described. The flanges 27ᵉ are adapted to align with the flanges 26ᵉ carried by the plates 26 at the ends of adjacent rows.

In assembling the form of conveyer belt shown in Figs. 10 to 14, inclusive, the plates 26 are arranged in rows with plates having flanges 26ᵉ located at the ends of alternate rows and with plates 27 located at the ends of alternate rows between those rows which are made up entirely of plates 26. As the rows of plates are assembled, the plates of adjacent rows are connected together by pivot pins 28 which are inserted through the aligning bearing portions of the plates and after being thus put in position, the arms 28ᵃ of the plates are forced upwardly from the position shown by dotted lines of 28ᵇ in Fig. 11 to the position shown at 28ᶜ in that figure, during which operation the arm of the pivot pin is snapped past the edge of the flange 27ᵉ which is formed on the end of the adjacent plate 27. The metal of the flange 27ᵉ yields sufficiently to permit this movement of the arm 28ᵃ into interlocking engagement therewith, as shown in Fig. 10, and when thus inserted the pins are prevented from being withdrawn until they are forced out of their interlocking engagement with the flanges 28ᵉ by a screw driver or other suitable tool. The arms 28ᵃ on adjacent pivot pins are located on opposite sides of the belt and are extended in opposite directions longitudinally of the belt so that they interlock with flanges 27ᵉ carried at opposite ends of the same row of plates, as shown in Fig. 10. When it is desired to replace any one of the plates 26 or 27, the arms 28ᵃ of the associated pivot pins may be forced out of enagement with the flanges 27ᵉ, after which the pivot pins may readily be withdrawn.

In both forms of the invention, the metal plates which are pivotally connected together are preferably formed of sheet metal which may be readily stamped, pressed and rolled into the desired form with the result that the belt is comparatively light and strong in construction and may be readily repaired by parts which may be easily put in place.

Although two forms of the invention have been shown and described by way of illustration, it will be understood that it may be constructed in various other embodiments coming within the scope of the appended claims.

I claim:

1. A conveyer belt comprising a plurality of metal plates arranged in parallel transverse rows, and pivot pins each connecting two adjacent rows, some of said plates having integral grooved flanges adapted to be bent into positions where said grooves are engaged by parts carried by the ends of said pins.

2. A conveyer belt comprising a plurality of sheet metal plates arranged edge to edge in parallel transverse rows, said plates having parts intermeshing with each other to prevent relative separation laterally of the belt of the plates in adjacent rows, and pivot pins engaging said intermeshing parts for securing adjacent rows together, certain of said plates at the edges of the belt having integral flanges along their outer edges bent inwardly into positions opposite the ends of said pins.

3. A conveyer belt comprising a plurality of sheet metal plates arranged edge to edge in parallel transverse rows, said plates having parts intermeshing with each other to prevent relative separation laterally of the belt of the plates in adjacent rows, and pivot pins engaging said intermeshing parts for securing adjacent rows together, certain of said plates having integral flanges bent inwardly at the edges of the belt to interlock with the end portions of said pins.

4. A conveyer belt comprising a plurality of metal plates arranged in parallel transverse rows, and pivot pins each connecting two adjacent rows, certain of said plates at the ends of the rows having transverse flanges, said pins having arms interlocking with said flanges.

5. A conveyer belt comprising a plurality of metal plates arranged in parallel transverse rows, and pivot pins each connecting two adjacent rows, certain of said plates at the ends of the rows having grooved flanges, said pins having arms adapted to snap into interlocking engagement with said grooves.

6. A conveyer belt comprising a plurality of metal plates arranged in parallel transverse rows, and pivot pins each connecting two adjacent rows, certain of said plates at the ends of the rows having resilient parts, said pins having parts adapted to snap past portions of said parts into interlocking engagement therewith.

ALLEN B. WILSON.